United States Patent
Guignard et al.

(10) Patent No.: US 10,297,161 B2
(45) Date of Patent: May 21, 2019

(54) METHOD AND SYSTEM FOR ASSISTING THE GUIDANCE OF AN AIRCRAFT ALONG A RUNWAY APPROACH AXIS

(71) Applicant: AIRBUS OPERATIONS (S.A.S.), Toulouse (FR)

(72) Inventors: Fabien Guignard, Colomiers (FR); Priteche Venilal, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 311 days.

(21) Appl. No.: 15/217,349

(22) Filed: Jul. 22, 2016

(65) Prior Publication Data

US 2017/0032684 A1    Feb. 2, 2017

(30) Foreign Application Priority Data

Jul. 31, 2015   (FR) ...................................... 15 57382

(51) Int. Cl.
*G08G 5/00* (2006.01)
*G05D 1/06* (2006.01)

(52) U.S. Cl.
CPC ......... *G08G 5/0047* (2013.01); *G05D 1/0676* (2013.01)

(58) Field of Classification Search
CPC ........................... G08G 5/0047; G05D 1/0676
See application file for complete search history.

(56) References Cited

U.S. PATENT DOCUMENTS

| 3,552,687 | A | 1/1971 | Howard et al. |
| 3,761,691 | A | 9/1973 | Schultz et al. |
| 2005/0237235 | A1* | 10/2005 | Falcati ...................... G01S 1/18 342/33 |
| 2008/0294307 | A1 | 11/2008 | Krogh |
| 2013/0245862 | A1* | 9/2013 | Putz ........................ G01C 23/00 701/18 |

FOREIGN PATENT DOCUMENTS

FR          2948468          1/2011

OTHER PUBLICATIONS

French Search Report for Application No. 1557382 dated May 19, 2016.

* cited by examiner

Primary Examiner — Jelani A Smith
Assistant Examiner — Kelly D Williams
(74) *Attorney, Agent, or Firm* — Jenkins, Wilson, Taylor & Hunt, P.A.

(57) ABSTRACT

A method and system for assisting guidance of an aircraft along a runway approach axis. The method includes acquiring a position deviation between a current position of the aircraft and the approach axis, determining an angle between a longitudinal axis of the aircraft and the approach axis, and determining a lateral offset of the trajectory of the aircraft likely to result from a maneuver of alignment of the longitudinal axis of the aircraft with the runway during the landing of the aircraft. A lateral trajectory correction is computed as a function of the lateral trajectory offset. This position deviation is corrected by adding the lateral trajectory correction to it. This position deviation is transmitted to the device for guiding the aircraft.

10 Claims, 3 Drawing Sheets

METHOD AND SYSTEM FOR ASSISTING THE GUIDANCE OF AN AIRCRAFT ALONG A RUNWAY APPROACH AXIS

CROSS-REFERENCE TO RELATED APPLICATION

This application claims the benefit of and priority to French patent application number 15 57382 filed on Jul. 31, 2015, the entire disclosure of which is incorporated by reference herein.

TECHNICAL FIELD

The disclosure herein relates to a method and to a system for assisting the guidance of an aircraft along a runway approach axis, and to an aircraft comprising such a system.

BACKGROUND

Aircraft, in particular transport airplanes, generally have to follow an approach axis when they are landing on a runway. This approach axis can notably correspond to an axis of an instrument approach of the ILS (Instrument Landing System) type or to an approach axis of the GLS (GPS Landing System) type. During such approaches, a unit for monitoring the position of the aircraft, in particular a unit of the MMR (Multi Mode Receiver) type, monitors a position deviation between a current position of the aircraft and the approach axis that the aircraft is supposed to follow. This deviation is transmitted to a device for guiding the aircraft, in order to allow guidance of the aircraft along the approach axis. The guidance device can correspond to an automatic pilot of the aircraft which automatically guides the aircraft along the approach axis in such a way as to reduce this deviation. This makes it possible to carry out an automatic landing function. According to a variant, the guidance device can correspond to a flight director which displays guidance information to a pilot of the aircraft.

As shown in FIG. 1, during an approach in side wind V conditions, the aircraft 1 must carry out a "crabbed" approach, that is to say one in which the front part of the aircraft is engaged along the approach axis 10 but the aircraft is oriented according to a non-zero angle θ (when projected onto a horizontal plane) between a longitudinal axis 12 of the aircraft and the approach axis 10. In FIG. 1, the aircraft is shown with such an orientation for two successive times t1 and t2. The engagement of the front part of the aircraft along the approach axis results from the fact that the current position of the aircraft taken into account by the monitoring unit of the MMR type corresponds to the position of a receiving antenna associated with this monitoring unit, this receiving antenna being situated at a point A at the front of the aircraft, for example in a nose radome. At the moment of the landing of the aircraft on the runway, the pilot of the aircraft must straighten the aircraft, during a maneuver called "de-crabbing", in such a way as to align the longitudinal axis 12 of the aircraft with the runway 5, in view of taxiing the aircraft on the runway. The act of aligning the longitudinal axis of the aircraft with the runway consists of bringing the longitudinal axis of the aircraft into an orientation in which it is parallel with a longitudinal axis of the runway. During the de-crabbing maneuver, the aircraft pivots about a center of rotation, generally close to its center of gravity. This results in a lateral offset Δ of the trajectory of the aircraft with respect to a longitudinal axis 14 centered on the runway, as shown in FIG. 1 for a time t3 after the landing of the aircraft. This lateral offset is added to a lateral offset (not shown in the figure) due to the error in the guidance of the aircraft along the approach axis.

The certification of the automatic landing function requires that the probability of landing the aircraft laterally beside the runway is less than once in 1,000,000 landings. In order to evaluate this probability, it is appropriate to consider the width of a typical runway and to take account of the distance between the main undercarriages of the aircraft in question, in order to define an authorized maximum lateral offset during a landing of the aircraft. This probability simultaneously takes account of the lateral offset due to the guidance error and of the lateral offset due to a possible side wind during the landing of the aircraft. Consequently, this lateral offset due to the wind reduces the authorized maximum lateral offset for determining an authorized lateral offset due to the guidance error of the aircraft. This reduction of the authorized lateral offset due to the guidance error of the aircraft has the effect of strengthening the performance requirements of the device for guiding the aircraft. This results in an increase of the complexity and of the cost of the device. Moreover, aircraft pilots generally prefer that the aircraft should land substantially on the center of the runway.

SUMMARY

A purpose of the present disclosure is notably to provide a solution to these problems. The subject matter herein relates to a method for assisting the guidance of an aircraft along a runway approach axis, the aircraft comprising a set of information sources, a processing unit and a device for guiding the aircraft, the method comprising the following steps implemented automatically by the processing unit:

acquiring, from the set of information sources, a position deviation between a current position of the aircraft and the approach axis; and transmitting this position deviation to the device for guiding the aircraft.

This method is noteworthy in that it comprises moreover the following steps implemented automatically by the processing unit of the aircraft:

acquiring, from the set of information sources, angular position of the aircraft information;

determining an angle between a longitudinal axis of the aircraft and the approach axis, as a function of the angular position of the aircraft;

determining, as a function of the angle, a lateral offset of the trajectory of the aircraft likely to result from a maneuver of alignment of the longitudinal axis of the aircraft with the runway during the landing of the aircraft;

computing a lateral trajectory correction as a function of the lateral trajectory offset; and correcting the position deviation by adding the lateral trajectory connection to it.

Thus, when the aircraft is carrying out a crabbed approach because of the presence of side wind, this method makes it possible to carry out guidance of the aircraft along a trajectory laterally corrected with respect to the approach axis. This makes it possible to compensate for the lateral offset due to the wind during the landing of the aircraft on the runway.

Advantageously, the angle between the longitudinal axis of the aircraft and the approach axis is determined by projection onto a horizontal plane.

In one embodiment, the method comprises moreover the following step:

monitoring a current position of the aircraft, and, in the step of computation of the lateral trajectory correction:
if the current position of the aircraft is situated upstream of a predetermined first point, the lateral trajectory correction is equal to a zero value; and
if the current position of the aircraft is situated downstream of a predetermined second point, the lateral trajectory correction is equal to the lateral trajectory offset.

Moreover, in an advantageous embodiment, when the current position of the aircraft varies from the predetermined first point up to the predetermined second point, the value of the lateral trajectory correction varies from a zero value up to the value of the lateral trajectory offset.

In a particular embodiment, the step of monitoring the current position of the aircraft comprises the monitoring of a current height of the aircraft. In another embodiment, this step of monitoring the current position of the aircraft comprises the monitoring of a current distance between the aircraft and the runway.

The disclosure herein also relates to a system for assisting the guidance of an aircraft along a runway approach axis, the system comprising a set of information sources, a processing unit and a device for guiding the aircraft, the processing unit being configured for:

acquiring, from the set of information sources, a position deviation between a current position of the aircraft and the approach axis; and
transmitting this position deviation to the device for guiding the aircraft.

This system is noteworthy in that the unit for monitoring the position of the aircraft is moreover configured for:

acquiring, from the set of information sources, angular position of the aircraft information;
determining an angle between a longitudinal axis of the aircraft and the approach axis, as a function of the angular position of the aircraft;
determining, as a function of the angle, a lateral trajectory offset of the aircraft likely to result from a maneuver of alignment of the longitudinal axis of the aircraft with the runway during the landing of the aircraft;
computing a lateral trajectory correction as a function of the lateral trajectory offset; and
correcting the position deviation by adding the lateral trajectory correction to it.

In one embodiment, the processing unit is configured for acquiring, from the set of information sources, a current position of the aircraft value, and for:

computing a lateral trajectory correction equal to a zero value if the current position of the aircraft is situated upstream of a predetermined first point; and
computing a lateral trajectory correction equal to the lateral trajectory offset if the current position of the aircraft is situated downstream of a predetermined second point.

Moreover, in an advantageous embodiment, the unit for monitoring the position of the aircraft is configured for computing a lateral trajectory correction varying from a zero value up to the value of the lateral trajectory offset when the current position of the aircraft varies from the predetermined first point up to the predetermined second point.

The disclosure herein also relates to an aircraft comprising a guidance assistance system such as mentioned above.

BRIEF DESCRIPTION OF THE DRAWINGS

The disclosure herein will be better understood on reading the following description and on examining the appended figures.

DETAILED DESCRIPTION

Figure 3:
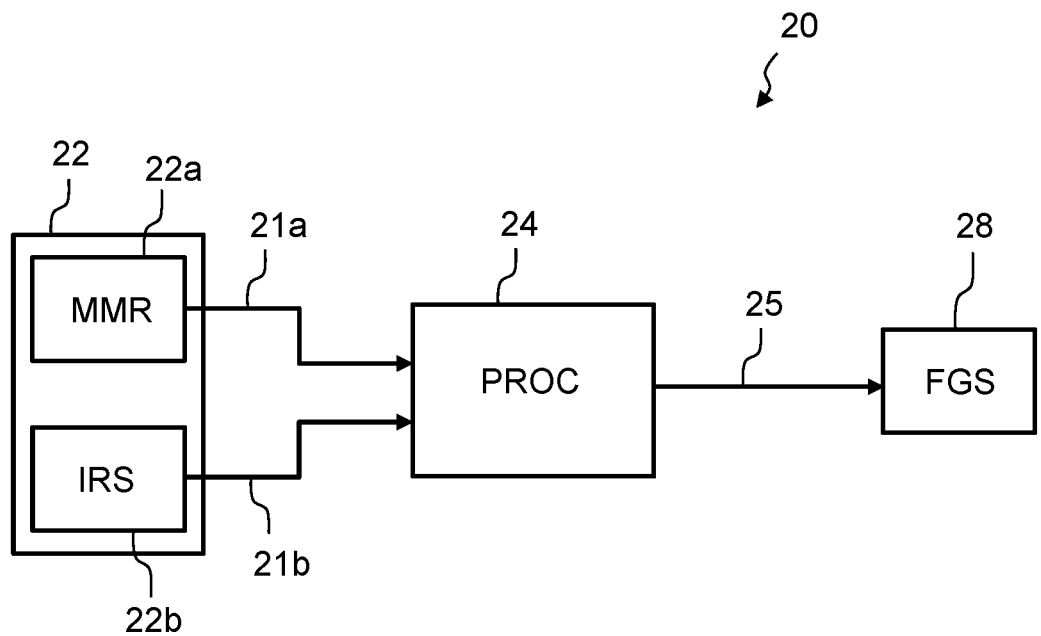
FIG. 3 shows a system for assisting the guidance of an aircraft, according to an embodiment of the disclosure herein.

The aircraft 1 comprises a system for assisting guidance 20 such as shown in FIG. 3. The system 20 comprises a set of information sources 22, including a monitoring unit 22a, for example of the MMR type, and at least one inertial system 22b of the IRS (Inertial Reference System) type. The system 20 also comprises a processing unit 24, connected to the monitoring unit 22a by a link 21a, as well as to the inertial system 22b by a link 21b. It also comprises a device guiding the aircraft 28, for example an aircraft guidance computer of the FGS (Flight Guidance System) type. Several embodiments are possible with regard to the processing unit 24: it can correspond to a specific computer, be integrated in a modular avionics computer, be integrated in the monitoring unit 22a or be integrated in the guidance device 28.

During operation, the processing unit 24 acquires in a usual way a position deviation between a current position of the aircraft and the approach axis of the runway. For this purpose, in the particular case in which the approach axis corresponds to an instrument approach of the ILS type, for which beacons situated on the ground close to the runway transmit beams of the "Glide" and "Loc" types, the monitoring unit 22a comprises a receiver of beams of the "Glide" and "Loc" types. As a function of the signals received by this receiver, the monitoring unit determines a deviation between the current position of the aircraft and the approach axis. In particular, the signals corresponding to the Loc beams make it possible to determine a lateral deviation between the current position of the aircraft and the approach axis. The monitoring unit 22a transmits this lateral deviation to the processing unit 24 through the link 21a and the processing unit 24 acquires the value of the lateral deviation. In another particular case in which the approach axis corresponds to an approach of the GLS type, the set of information sources 22 comprises a unit for measuring a current position of the aircraft. This unit for measuring the current position of the aircraft can notably correspond to the inertial system 22b, to a GPS receiver integrated in the monitoring unit 22a or to the combination of an inertial system and a GPS receiver so as to provide a hybrid inertial-GPS position measurement. In such an approach of the GLS type, the approach axis is defined in a database, which makes it possible to compute a deviation between the current position of the aircraft and the approach axis. The computations making it possible to determine the deviation between the current position of the aircraft and the approach axis can be carried out either in the monitoring unit 22a, or in the processing unit 24.

The set of information sources 22 determines moreover angular position of the aircraft information. According to a particular embodiment, this angular position information corresponds to a heading angle (heading) of the aircraft, measured by the inertial system 22b. The inertial system transmits this angular position information to the processing unit 24 through the link 21b.

Figure 4:
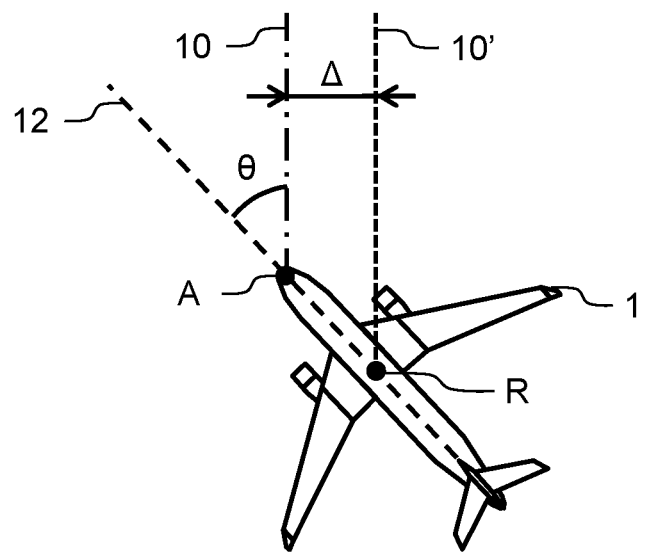
FIG. 4 illustrates the computation of a lateral trajectory offset, according to an embodiment of the disclosure herein.

The processing unit 24 determines an angle θ, considered in projection onto a horizontal plane and, such as shown in FIG. 4, between a longitudinal axis 12 of the aircraft and the approach axis 10, as a function of the angular position of the aircraft, in particular its heading angle. In order to do this, according to one embodiment, the processing unit 24 acquires heading angle information of the runway and it computes the angle θ as corresponding to the difference between the heading angle of the aircraft and the heading angle of the runway (the runway being aligned with the approach axis). The heading angle of the runway information can notably be information recorded in a database installed on board the aircraft, for example a database of a flight management computer of the FMS (Flight Management System) type. According to another embodiment, the processing unit 24 acquires route angle (Track angle) information, provided for example by the inertial system 22b, via the link 21b. Insofar as the aircraft is guided sufficiently accurately along the approach axis 10 of the runway, it is possible to consider that the track of the aircraft corresponds to the approach axis or is substantially parallel to the approach axis. The processing unit 24 then computes the angle θ as corresponding to the difference between the heading angle of the aircraft and the track angle of the aircraft.

As illustrated in plan view in FIG. 4, the processing unit 24 determines a lateral trajectory offset Δ of the aircraft, likely to result from a maneuver of alignment of the longitudinal axis 12 of the aircraft with the runway 5 during the landing of the aircraft. Such a maneuver corresponds to a maneuver called "de-crabbing" as mentioned above. As FIG. 4 corresponds to a situation in which the aircraft is in flight during a runway approach phase, the runway is not visible in the figure: all that can be seen is the approach axis 10, which is aligned (in plan view) with the runway. As mentioned above, the antenna for receiving ILS signals, used for an instrument approach of the ILS type, is situated at a point A, in a front part of the aircraft. During the "de-crabbing" maneuver, the aircraft pivots about a center of rotation R. The processing unit 24 computes the lateral trajectory offset Δ according to the formula:

$$\Delta = D_{AR} \times \cos(\theta)$$

wherein $D_{AR}$ is the distance between the points A and R.

As the center of rotation R is substantially constant for a given type of aircraft, the result is that the distance $D_{AR}$ is also substantially constant for a given type of aircraft. The center of rotation R is generally close to the center of gravity of the aircraft. Consequently, according to a first alternative, the distance $D_{AR}$ is determined by considering that this center of rotation R is merged with the center of gravity of the aircraft. According to a second alternative, the position of the center of rotation R is determined experimentally during flight tests on an aircraft of the aircraft type in question.

The processing unit 24 determines a lateral trajectory correction as a function of the determined lateral trajectory offset Δ, then it corrects the position deviation (between the current position of the aircraft and the approach axis of the runway) by adding this lateral trajectory correction to it. The processing unit 24 transmits the position deviation thus corrected to the device 28 for guiding the aircraft. The aircraft is thus guided along an approach trajectory offset with respect to the approach axis 10, in such a way as to at least partially compensate for the lateral trajectory offset resulting from a "de-crabbing" maneuver during the landing.

In a first embodiment, the lateral trajectory correction is equal to the lateral trajectory offset Δ. Thus, a "de-crabbing" maneuver during the landing has the effect of bringing the aircraft substantially onto the longitudinal axis 14 situated at the center of the runway.

Figure 1:
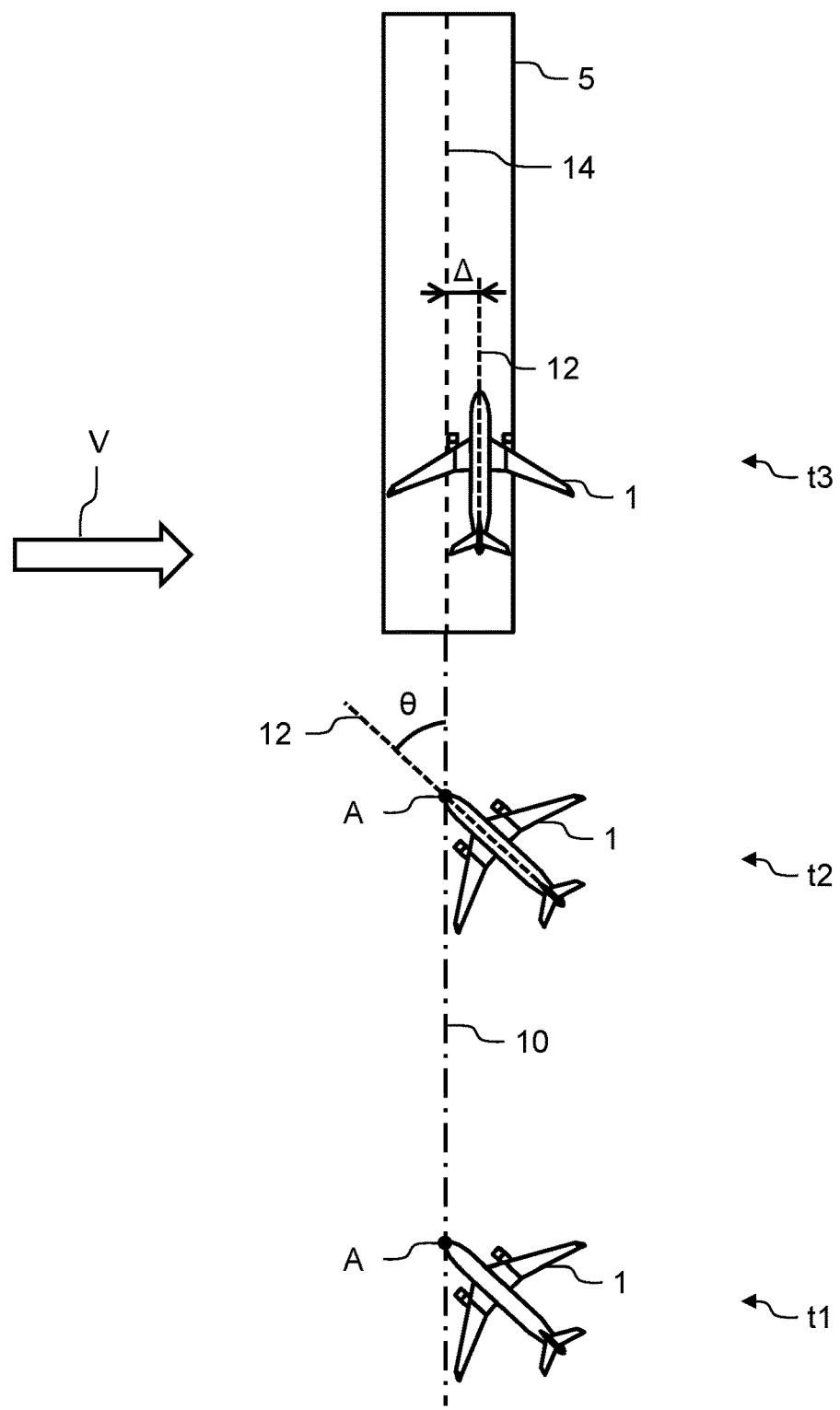
FIG. 1, already described, illustrates an approach and a landing of an aircraft on a runway in side wind conditions according to the prior art.
Figure 2:
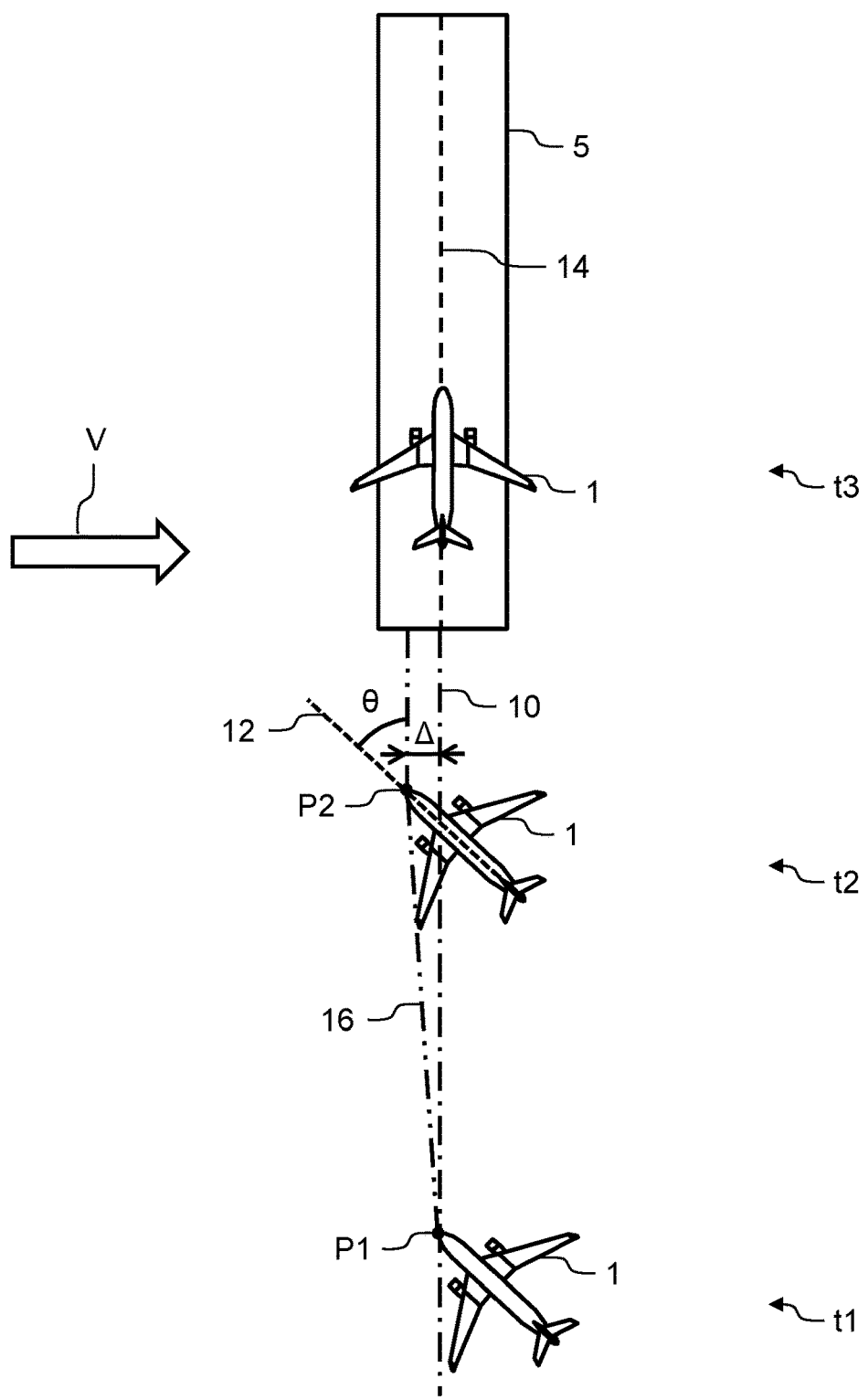
FIG. 2 illustrates and approach and a landing of an aircraft on a runway in side wind conditions according to an embodiment of the disclosure herein.

In a second embodiment, the processing unit 24 acquires moreover current position of the aircraft information transmitted by the monitoring unit 22a through the link 21a. The processing unit 24 monitors the current position of the aircraft. As shown in FIG. 2, when the current position of the aircraft is situated upstream of a predetermined first point P1, the lateral trajectory correction computed by the processing unit is equal to a zero value. When the current position of the aircraft is situated downstream of a predetermined second point P2, the lateral trajectory correction computed by the processing unit is equal to the lateral trajectory offset Δ. When the current position of the aircraft varies from the point P1 to the point P2, the lateral trajectory correction varies progressively from the zero value up to the lateral trajectory offset Δ. This allows a progressive application of the lateral trajectory correction, in such a way that the latter occurs substantially unperceived by the crew of the aircraft. Because of the lateral trajectory correction, the aircraft is guided along the trajectory 16 shown in the figure. Given that downstream of the point P2 the lateral trajectory correction is equal to the lateral trajectory offset Δ, as in the first embodiment, a "de-crabbing" maneuver during the landing also has the effect of bringing the aircraft substantially onto the longitudinal axis 14 situated at the center of the runway.

According to a particular embodiment, the monitoring of the current position of the aircraft by the processing unit 24 comprises the monitoring of a current height of the aircraft. The current position of the aircraft is thus considered as situated upstream of the predetermined first point P1 when the current height of the aircraft is greater than the height of the predetermined first point P1 and the current position of the aircraft is considered as situated downstream of the predetermined second point P2 when the current height of the aircraft is less than the height of the predetermined second point P2.

According to another particular embodiment, the monitoring of the current position of the aircraft by the processing unit 24 comprises the monitoring of a current distance between the aircraft and the runway. The current position of the aircraft is thus considered as situated upstream of the predetermined first point P1 when the current distance between the aircraft and the runway is greater than the distance between the predetermined first point P1 and the runway. The current position of the aircraft is considered to be situated downstream of the predetermined second point P2 when the current distance between the aircraft and the runway is less than the distance between the predetermined point P2 and the runway.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assisting guidance of an aircraft along a runway approach axis, the aircraft comprising a set of information sources, a processing unit and an automatic pilot device for guiding the aircraft, the method comprising:
   automatically acquiring, by the processing unit, from the set of information sources, a position deviation between a current position of the aircraft and the runway approach axis;
   automatically determining, by the processing unit, an angle between a longitudinal axis of the aircraft and a trajectory of the aircraft;
   automatically determining, by the processing unit, as a function of the angle, a lateral trajectory offset of the aircraft likely to result from a maneuver of alignment of the longitudinal axis of the aircraft with a runway during a landing of the aircraft;
   automatically computing, by the processing unit, a lateral trajectory correction as a function of the lateral trajectory offset;
   automatically correcting, by the processing unit, the position deviation by adding the lateral trajectory correction to the position deviation; and
   automatically transmitting, by the processing unit the position deviation to the automatic pilot device for guiding the aircraft;
   automatically maneuvering the aircraft, by the automatic pilot device, based on the position deviation transmitted.

2. The method as claimed in claim 1, wherein the angle between the longitudinal axis of the aircraft and the runway approach axis is determined by projection onto a horizontal plane.

3. The method as claimed in claim 1, comprising:
   monitoring a current position of the aircraft; and
   in computation of the lateral trajectory correction:
      if the current position of the aircraft is situated upstream of a predetermined first point, the lateral trajectory correction is equal to a zero value; and
      if the current position of the aircraft is situated downstream of a predetermined second point, the lateral trajectory correction is equal to the lateral trajectory offset.

4. The method as claimed in claim 3, wherein when the current position of the aircraft varies from the predetermined first point up to the predetermined second point, the value of the lateral trajectory correction varies from a zero value up to the value of the lateral trajectory offset.

5. The method as claimed in claim 3, wherein monitoring the current position of the aircraft comprises monitoring of a current height of the aircraft.

6. The method as claimed in claim 3, wherein monitoring the current position of the aircraft comprises monitoring of a current distance between the aircraft and the runway.

7. A system for assisting guidance of an aircraft along a runway approach axis comprising:
   a set of information sources;
   a processing unit; and
   an automatic pilot device for guiding the aircraft,
   wherein the processing unit is configured for:
      automatically acquiring, from the set of information sources, a position deviation between a current position of the aircraft and the runway approach axis;
      automatically determining an angle between a longitudinal axis of the aircraft and a trajectory of the aircraft;
      automatically determining, as a function of the angle, a lateral trajectory offset of the aircraft likely to result from a maneuver of alignment of the longitudinal axis of the aircraft with a runway during a landing of the aircraft;
      automatically computing a lateral trajectory correction as a function of the lateral trajectory offset;
      automatically correcting the position deviation by adding the lateral trajectory correction to the position deviation; and
      automatically transmitting the position deviation to the automatic pilot device for guiding the aircraft; and
   wherein the automatic pilot device is configured for automatically maneuvering the aircraft based on the position deviation transmitted.

8. The system as claimed in claim 7 wherein the processing unit is configured for acquiring, from the set of information sources, a current position of the aircraft value, and for:
   computing a lateral trajectory correction equal to a zero value if the current position of the aircraft is situated upstream of a predetermined first point; and
   computing a lateral trajectory correction equal to the lateral trajectory offset if the current position of the aircraft is situated downstream of a predetermined second point.

9. The system as claimed in claim 8 wherein the processing unit is configured for computing a lateral trajectory correction varying from a zero value up to the value of the lateral trajectory offset when the current position of the aircraft varies from the predetermined first point up to the predetermined second point.

10. An aircraft comprising a system for assisting guidance of an aircraft along a runway approach axis comprising:
   a set of information sources;
   a processing unit; and
   an automatic pilot device for guiding the aircraft,
   wherein the processing unit is configured for:

automatically acquiring, from the set of information sources, a position deviation between a current position of the aircraft and the runway approach axis;

automatically determining an angle between a longitudinal axis of the aircraft and a trajectory of the aircraft;

automatically determining, as a function of the angle, a lateral trajectory offset of the aircraft likely to result from a maneuver of alignment of the longitudinal axis of the aircraft with a runway during a landing of the aircraft;

automatically computing a lateral trajectory correction as a function of the lateral trajectory offset;

automatically correcting the position deviation by adding the lateral trajectory correction to the position deviation; and automatically transmitting the position deviation to the automatic pilot device for guiding the aircraft; and wherein the automatic pilot device is configured for automatically maneuvering the aircraft based on the position deviation transmitted.

\* \* \* \* \*